(12) United States Patent
Gast

(10) Patent No.: US 12,411,075 B2
(45) Date of Patent: Sep. 9, 2025

(54) OPTICAL SENSOR WINDOW CLEANER

(71) Applicant: ENTEGRIS, INC., Billerica, MA (US)

(72) Inventor: Tracy Gast, Eden Prairie, MN (US)

(73) Assignee: ENTEGRIS, INC., Billerica, MA (US)

( * ) Notice: Subject to any disclaimer, the term of this patent is extended or adjusted under 35 U.S.C. 154(b) by 107 days.

(21) Appl. No.: 17/075,329

(22) Filed: Oct. 20, 2020

(65) Prior Publication Data

US 2021/0131949 A1 May 6, 2021

Related U.S. Application Data

(60) Provisional application No. 62/931,409, filed on Nov. 6, 2019.

(51) Int. Cl.
*G01N 21/15* (2006.01)
*B08B 3/04* (2006.01)

(52) U.S. Cl.
CPC ............. *G01N 21/15* (2013.01); *B08B 3/04* (2013.01); *G01N 2021/155* (2013.01)

(58) Field of Classification Search
CPC ........ G01N 21/15; G01N 21/47; G01N 21/53; G01N 21/64; G01N 2021/55; G01N 2021/151; G01N 2021/155; G01N 2021/157; B08B 3/04; B08B 3/02; B08B 5/00; G02B 27/0006; H01J 5/16
See application file for complete search history.

(56) References Cited

U.S. PATENT DOCUMENTS

| | | | |
|---|---|---|---|
| 3,861,198 A * | 1/1975 | Shea | G01N 21/15 73/61.41 |
| 6,549,276 B1 * | 4/2003 | Longtin | G01N 21/4133 356/128 |
| 8,421,046 B2 * | 4/2013 | Leuthold | G07D 7/12 356/429 |
| 9,001,319 B2 | 4/2015 | Tokhtuev | |
| 9,541,539 B2 | 1/2017 | Machuca | |
| 9,599,557 B2 | 3/2017 | Gigler | |
| 9,810,676 B2 | 11/2017 | Xiong | |
| 11,174,751 B2 | 11/2021 | Kulkarni et al. | |
| 2005/0081893 A1 | 4/2005 | Nilsen | |
| 2006/0192968 A1 * | 8/2006 | Farrant | G01N 21/15 356/239.2 |

(Continued)

FOREIGN PATENT DOCUMENTS

| | | | |
|---|---|---|---|
| CN | 104510434 A | * | 4/2015 |
| CN | 105344511 A | | 2/2016 |

(Continued)

*Primary Examiner* — Michael A Lyons

(57) ABSTRACT

A sensor assembly includes a passageway for a process fluid, an optical window, an optical sensor, and a nozzle. The optical sensor configured to detect an optical property of the process fluid. The optical window includes an inner surface. The nozzle configured discharge an atomized fluid in a discharge direction that intersects the inner surface of the optical window. A sensor system includes a sensor assembly and conduits for supplying a gas and a liquid to a nozzle of the sensor assembly. A method of cleaning an optical window in a sensor assembly includes forming an atomized fluid and discharging the atomized fluid in a discharge direction that intersects the optical window.

18 Claims, 4 Drawing Sheets

(56) References Cited

U.S. PATENT DOCUMENTS

| | | | | |
|---|---|---|---|---|
| 2009/0253964 A1* | 10/2009 | Miyamoto | ......... | A61B 1/00091 |
| | | | | 600/157 |
| 2011/0061684 A1 | 3/2011 | Tomita et al. | | |
| 2011/0180694 A1 | 7/2011 | Leuthold | | |
| 2013/0293881 A1* | 11/2013 | Tokhtuev | ............... | G01N 21/85 |
| | | | | 356/246 |
| 2016/0003736 A1* | 1/2016 | Gigler | .................... | G01N 21/53 |
| | | | | 356/338 |
| 2018/0272998 A1 | 9/2018 | Schmidt | | |

FOREIGN PATENT DOCUMENTS

| | | | |
|---|---|---|---|
| CN | 107209108 | A | 9/2017 |
| CN | 108202030 | A | 6/2018 |
| CN | 108993960 | A | 12/2018 |
| CN | 214844758 | U | 11/2021 |
| EP | 1302584 | B1 | 3/2008 |
| EP | 29829641 | A | 2/2016 |
| JP | 2004151086 | A | 5/2004 |
| JP | 3853295 | B2 * | 12/2006 |
| TW | 203565 | B | 4/1993 |
| TW | 201602547 | A | 1/2016 |

\* cited by examiner

OPTICAL SENSOR WINDOW CLEANER

CROSS-REFERENCE TO RELATED APPLICATION

This application claims the benefit of and priority to U.S. Provisional Application No. 62/931,409 filed on Nov. 6, 2019, which is incorporated by reference herein in its entirety for all purposes.

TECHNICAL FIELD

This disclosure relates to sensors used to measure a property of a fluid. More specifically, this disclosure relates to optical sensors that measure an optical property of a flowing fluid.

BACKGROUND

Optical sensors can be used to determine one or more properties of a flowing fluid. Optical sensors can transmit light through a window towards the fluid. The light can be refracted at the boundary between the window and the fluid. Optical sensors can determine a refractive index of the fluid by detecting an amount, an angle, or an amount and an angle of the light refracted by the fluid. The refractive index of the fluid can be used to determine other properties of the fluid. For example, a concentration or purity of the fluid might be determined using the refractive index of the fluid. The process fluid can include liquids or a mixture including liquid(s) and solid(s).

SUMMARY

A sensor system includes a sensor assembly and a conduit that supplies a process fluid to the sensor assembly. The sensor assembly includes a passageway for the process fluid, an optical window, and an optical sensor. The optical window forms a sidewall of the passageway. The process fluid flows through the passageway and contacts the optical window. The sensor is configured to transmit light through the optical window and to detect an optical property of process fluid.

Embodiments are disclosed for a sensor system, a sensor assembly, and a method for cleaning an optical window. In an embodiment, a sensor system includes a sensor assembly. A process fluid is supplied to the sensor assembly. In some embodiments, the sensor assembly includes an optical window and an optical sensor for detecting an optical property of the process fluid.

In an embodiment, a sensor system includes a sensor assembly and a fluid circuit (e.g., conduits, piping, tubing, combinations thereof, or the like) for supplying a process fluid, a liquid, and a gas to the sensor assembly. The sensor assembly includes a passageway for the process fluid, an optical window, and a nozzle. The optical window forms a sidewall of the passageway and the process fluid contacts the optical window. The fluid circuit fluidly connects to the nozzle for supplying a liquid. The fluid circuit also fluidly connects to the nozzle for supplying a gas. The nozzle is configured to discharge an atomized fluid including the liquid and the gas in a direction that impacts the inner surface of the optical window. The atomized fluid impacts and removes material that can scatter light.

In an embodiment, a sensor assembly includes a passageway for the process fluid, an optical window, and a nozzle. The optical window forms a sidewall of the passageway and the process fluid configured to contact the optical window. The nozzle is configured to form and discharge an atomized fluid including a liquid and a gas in a direction that impacts the inner surface of the optical window.

In an embodiment, a method of cleaning an optical window in a sensor assembly includes atomizing a liquid and a gas. The sensor assembly includes a passageway for a process fluid, the optical window, and an optical sensor for the process fluid. The atomized fluid is discharged into the passageway in a direction that impacts the optical window.

BRIEF DESCRIPTION OF THE DRAWINGS

Both described and other features, aspects, and advantages of a sensor system, sensor assembly, and a method of cleaning an optical window in a sensor assembly will be better understood with the following drawings.

Figure 1:
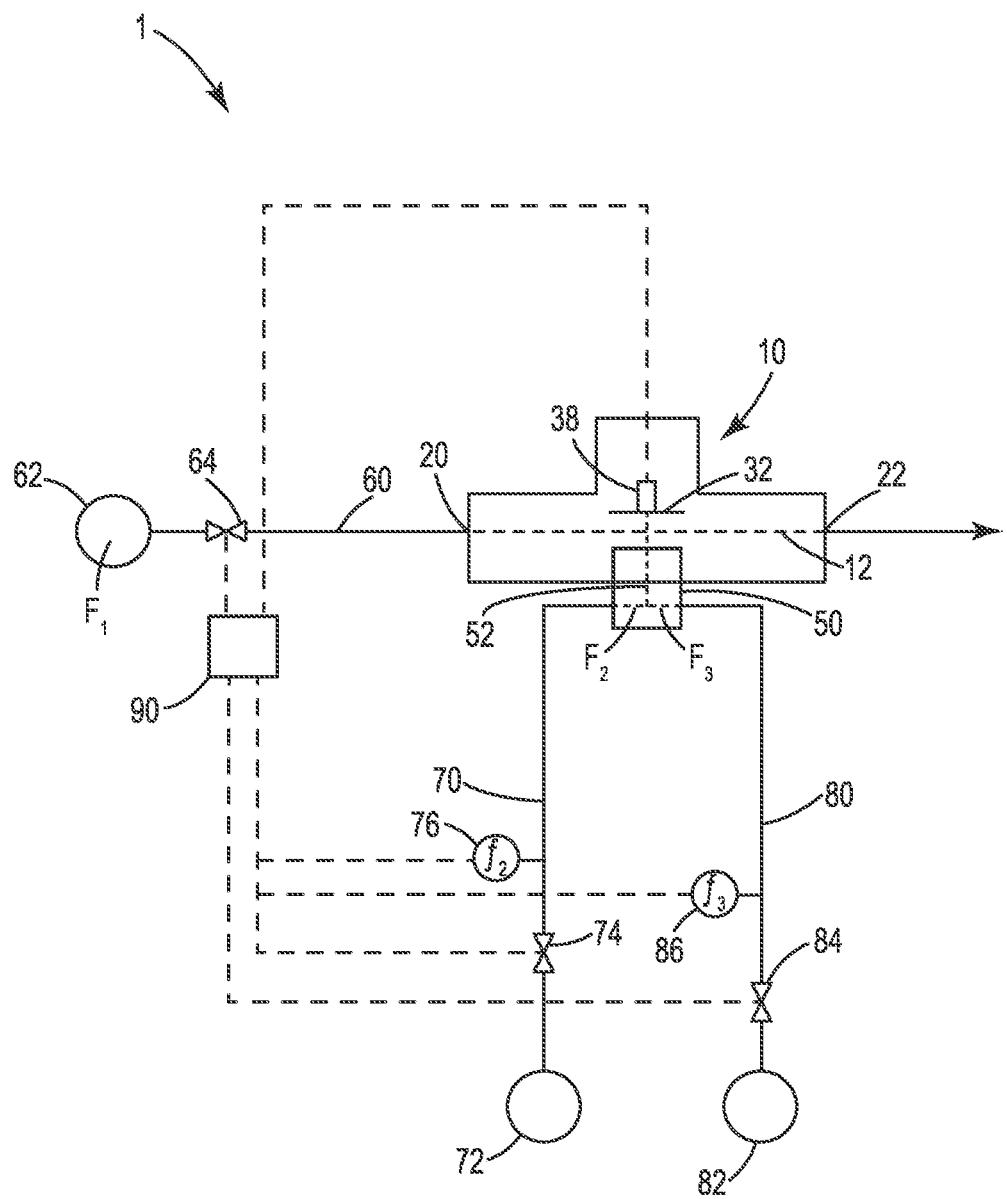
FIG. 1 is a schematic diagram of an embodiment of a sensor system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

An optical sensor can be used to detect one or more optical properties of a fluid. The fluid can be directed to flow along one side of the optical window while the optical sensor is located along another side of the window. An optical sensor can be configured to transmit light through the optical window and detect how the fluid affects the light. For example, the optical sensor may be configured to detect how the light is refracted at the transition between the optical window and the flowing fluid. For example, the optical sensor may be configured to detect the amount of light reflected by the flowing fluid. An optical property of the process fluid may be used to determine one or more other properties of the process fluid such as, for example, the concentration or purity of the process fluid.

Component(s) of the fluid can be attracted to the optical window and deposit on the optical window, forming a layer of material on the optical window. The attraction and deposition of the component(s) to the optical window can be caused by, for example, intermolecular forces between the component(s) and the material(s) of the optical window (e.g., the zeta potential of the components can drive them toward the optical window, and attraction driven by van der Waal forces once in proximity with each other). This problem may occur more significantly when the fluid includes solid particles which may adhere to the optical window more easily. Further, it has been found that the deposition becomes more difficult to remove over time. Therefore, particles deposit more strongly and become more difficult to remove the longer they remain on the optical window.

Those having ordinary skill in the art will recognize that a partial layer of material on the optical window can adversely impact the transmission of light and create erroneous measurements. In sensors that are relied upon for high accuracy measurements, such as in semiconductor manufacturing, this error can have a significant adverse impact in the semiconductor manufacturing process.

Embodiments are disclosed herein related to a sensor assembly, a sensor system, and method of cleaning an optical window in a sensor assembly. As used herein, cleaning an optical window can include, for example, removing a deposited component from the optical window to at least partially expose a surface of the optical window. A sensor system can include a sensor assembly. The embodiments described herein are capable of discharging an atomized fluid at the optical window to remove most to all of any material deposited on the optical window. Atomizing a liquid to discharge the atomized fluid can accelerate the liquid portion of the atomized fluid and lead to cavitation on the surface (e.g., implosion of a drop of the liquid portion of the atomized fluid after impacting the optical window). Without being bound by theory, it is believed that the impact of the drops of the liquid portion of the atomized fluid onto the optical window can initiate a shockwave, thereby removing deposits or material from the optical window.

FIG. 1 is a schematic diagram of an embodiment of a sensor system 1. The sensor system 1 includes a sensor assembly 10 configured to detect one or more optical properties of a process fluid $F_1$. In an embodiment, the sensor assembly 10 detects a refractive index of the process fluid $F_1$.

The sensor assembly 10 includes a passageway 12, an optical window 32, an optical sensor 38, and a nozzle 50. The passageway 12 includes an inlet 20 and an outlet 22. The passageway 12 extends through the sensor assembly 12 from the inlet 20 to the outlet 22. The process fluid $F_1$ flows through the sensor assembly 10 by flowing through the passageway 12. The process fluid $F_1$ flows through the sensor assembly 10 by entering through the inlet 20, flowing through the passageway 12, and then exiting through the outlet 22.

A first conduit 60 supplies the process fluid $F_1$ to the inlet 20 of the passageway 12. The first conduit 60 fluidly connects a process fluid source 62 to the inlet 20. The process fluid $F_1$ flows from the process fluid source 62 through the first conduit 60 to passageway 12. In an embodiment, the process fluid source 62 may be a tank containing process fluid $F_1$. In an embodiment, the process fluid source 62 may be a plurality of tanks containing components of the process fluid $F_1$ and the process fluid source 62 mixes the components to form the process fluid $F_1$, which is then supplied by the first conduit 60. The first conduit 60 includes a flow valve 64. The flow valve 64 controls a flowrate $f_1$ of the process fluid $F_1$ supplied by the first conduit 60 to the passageway 12 and the sensor assembly 10. In an embodiment, the flow valve 64 is controlled by the controller 90. The controller 90 is configured to adjust the flow valve 64 to control the flowrate $f_1$ of the process fluid $F_1$ to and through the sensor assembly 10.

In an embodiment, the process fluid $F_1$ is used for polishing in semiconductor wafer in semiconductor manufacturing. The process fluid $F_1$ contains liquid and abrasive particles. In an embodiment, the abrasive particles include one or more of ceria, colloidal silica, fumed silica, and lanthanum fluoride. In an embodiment, the process fluid $F_1$ contains at least 0.1 wt. % of the abrasive particles. In an embodiment, the process fluid $F_1$ contains from about 0.1 wt. % to about 30 wt. % of the abrasive particles. In an embodiment, a liquid used for the process fluid $F_1$ can include water or water-based solutions.

The process fluid $F_1$ flows along the optical window 32 when flowing through the passageway 12 from the inlet 20 to the outlet 22. The optical sensor 38 is located along the optical window 32. The optical sensor 38 transmits light through the optical window 32 towards the passageway 12. The optical sensor 38 also detects the light refracted by the process fluid $F_1$. The optical sensor 38 configured to detect a refractive index of the process fluid $F_1$ by detecting the light refracted by the process fluid $F_1$.

The nozzle 50 can clean the optical window 32. The nozzle 50 forms an atomized fluid 52 and discharges the atomized fluid 52 toward the optical window 32. The atomized fluid 52 impacts the optical window 32 and is configured to remove material that is deposited on the optical window 32. In an embodiment, the nozzle 50 can be referred to as an air-blast or air-assist atomizer. Operation of the nozzle 50 is discussed in more detail below. The atomized fluid 52 contains a liquid $F_2$ and a gas $F_3$. A second conduit 70 supplies the liquid $F_2$ to the nozzle 50 and a third conduit 80 supplies the gas $F_3$ to the nozzle 50. The nozzle 50 is configured to combine the liquid $F_2$ and the gas $F_3$ to form the atomized fluid 52.

The second conduit 70 is fluidly connected to the nozzle 50 and supplies the liquid $F_2$ to the nozzle 50. In an embodiment, the liquid $F_2$ includes one or more of water, ammonium hydroxide, and a liquid low contaminant semiconductor fabrication cleaning products (e.g., PlanarClean AG-Ce1000K, ESC 784 Cleaning Solution, or the like). In an embodiment, the water is deionized ("DI") water. In an embodiment, the second conduit 70 fluidly connects a liquid source 72 to the nozzle 50. In an embodiment, the liquid source 72 includes a filter and/or one or more tank(s) containing the liquid $F_2$. In an embodiment, the liquid source 72 is a filter that generates DI water.

The second conduit 70 includes a flow valve 74 and a flow sensor 76. The flow valve 74 controls the flowrate $f_2$ of the liquid $F_2$ supplied to the nozzle 50. The flow sensor 76 detects the flowrate $f_2$ of the liquid $F_2$ through the second conduit 70 and supplied to the nozzle 50. In an embodiment, the controller 90 controls the flow valve 74. The controller 90 may control the flowrate $f_2$ of the liquid $F_2$ supplied to the nozzle 50 to be a particular amount or within a specific range as discussed below. The controller 90 may utilize the flow sensor 76 to detect the flowrate $f_2$ of the liquid $F_2$ being supplied to the nozzle 50.

The third conduit 80 is fluidly connected to the nozzle 50 and supplies the pressurized gas $F_3$ to the nozzle 50. In an embodiment, the gas $F_3$ includes one or more or an inert gas and clean dry air (CDA). In an embodiment, the gas $F_3$ is an inert gas that may include one or more of, but is not limited to, nitrogen, helium, neon, argon, krypton, xenon, and the like. In an embodiment, the gas $F_3$ is nitrogen. In an embodiment, the first conduit 80 fluidly connects a gas source 82 to the nozzle 50. In an embodiment, the liquid source 82 includes one or both of a filter and one or more tank(s) containing the gas $F_3$. In an embodiment, the liquid source 82 is a filter that produces purified nitrogen and/or argon from air.

The conduit 80 includes a flow valve 84 and a flow sensor 86. The flow valve 84 controls the flowrate $f_3$ of the gas $F_3$ supplied to the nozzle 50. The flow sensor 86 detects the flowrate $f_3$ of the gas $F_3$ through the conduit 80 and supplied to the nozzle 50. In an embodiment, the controller 90 controls the flow valve 84. The controller 90 may control the flowrate $f_3$ of the gas $F_3$ supplied to the nozzle 50 to be a particular amount or within a specific range as discussed below. The controller 90 may utilize the flow sensor 86 to detect the flowrate $f_3$ of the gas $F_3$ being supplied to the nozzle 50.

Figure 2:
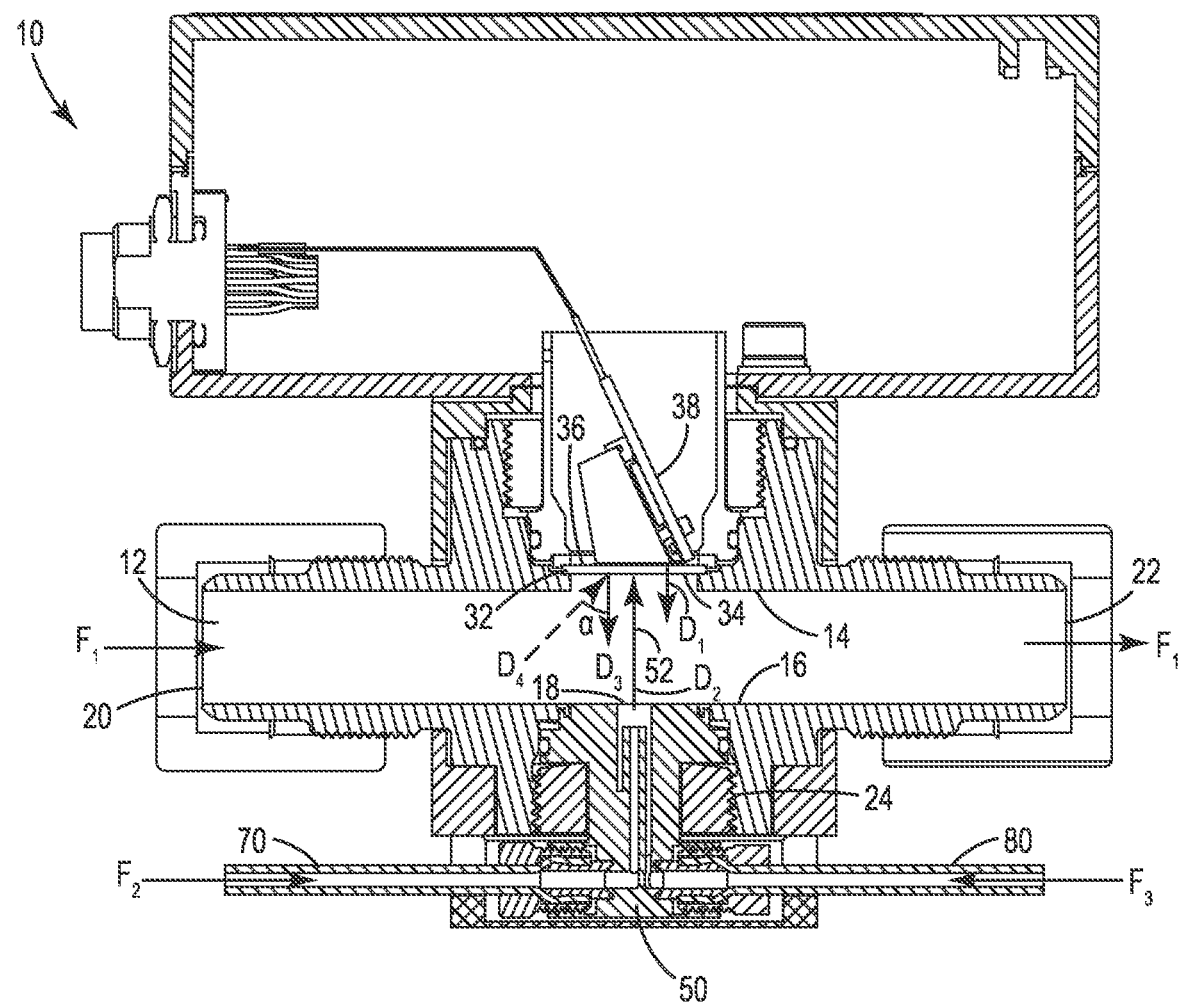
FIG. 2 is a cross sectional view of the sensor assembly in FIG. 1, according to an embodiment of the disclosure.

FIG. 2 is a cross sectional view of an embodiment of the sensor assembly 10. The sensor assembly 10 includes the passageway 12 with the inlet 20 and the outlet 22, the optical window 32, the optical sensor 38, the nozzle 50, the second conduit 70 for the liquid $F_2$, and the third conduit 80 for the gas $F_3$.

The process fluid $F_1$ flows through the sensor assembly 10 by flowing through the passageway 12. The passageway 12 extends from the inlet 20 to the outlet 22. The process fluid $F_1$ is configured to enter through the inlet 20 and exit through the outlet 22. The optical window 32 and the nozzle 50 are each positioned along the passageway 12.

The optical window 32 forms a sidewall 14 of the passage 12. The optical window 32 includes an inner surface 34 and an outer surface 36. The outer surface 36 is opposite to the inner surface 34. In an embodiment, the inner surface 34 of the optical window 32 forms a sidewall 14 of the passage 12. The process fluid $F_1$ contacts the inner surface 34 of the optical window 32 when flowing through the passageway 12. The inner surface 34 of the optical window 32 is made of a scratch resistant material. In an embodiment, the inner surface 34 of the optical window 32 is made of diamond or sapphire. In an embodiment, the inner surface 34 of the optical window 32 is made of borosilicate glass.

The optical sensor 38 is attached to the optical window 32. In an embodiment, the optical sensor 38 is attached to the outer surface 36 of the optical window 32. The optical sensor 38 is configured to transmit light through the optical window 32 and detect light transmitted towards the optical sensor 38 in the optical window 32. For example, the optical sensor 38 may transmit light in the direction $D_1$ towards the passageway 32. The optical sensor 38 is configured to detect light refracted by the process fluid $F_1$ at the inner surface 34. The detected light refraction can then be used to determine the refraction index of the process fluid $F_1$.

The conduits 70, 80 supply the liquid $F_2$ and the gas $F_3$ to the nozzle 50. The nozzle 50 discharges an atomized fluid 52 of the liquid $F_2$ and the gas $F_3$ into the passageway 12. The atomized fluid 52 is discharged through an opening 18 in the second sidewall 16 of the passageway 12. In an embodiment, the second sidewall 16 is opposite to the first sidewall 14. In an embodiment, the second sidewall 16 is formed by the nozzle 50. In an embodiment, the atomized fluid 52, the liquid $F_2$, and the gas $F_3$ do not enter through the inlet 20 of the passageway 12. The atomized fluid 52 is discharged at the inner surface 34 of the optical window 32. The nozzle 50 discharges the atomized fluid 52 in a direction that impacts the inner surface 34 of the optical window 32. In an embodiment, the direction of the atomized fluid 52 can be referred to as the discharge direction $D_2$. In an embodiment, the discharge direction $D_2$ intersects the inner surface 34 of the optical window 32. In an embodiment, the discharge direction $D_2$ is perpendicular to the inner surface 34 of the optical window 32.

As similarly discussed above, material builds upon the inner surface 34 of the optical window 32 as the process fluid $F_1$ flows along and contracts the inner surface 34 of the optical window 32. In an embodiment, solid abrasive particles in the process fluid $F_1$ adhere to and build up on inner surface 34 of the optical window 32.

The nozzle 50 is configured to discharge the atomized fluid 52 at a high speed at the optical window 32. The configuration and operation of the nozzle 50 is discussed in more detail below. Liquid $F_2$ droplets in the atomized fluid 52 impact the inner surface 34 of the optical window 32 at a high speed. In an embodiment, each high speed impact creates a liquid shockwave that travels outwardly along the inner surface 34 from the impact point. The liquid shockwave applies a shear force that removes material that has built up on the inner surface. In an embodiment, the high speed impact of a droplet on the optical window 32 causes cavitation at the impact point. The cavitation further acting to remove any material adhered to the inner surface 34 of the optical window 32. In an embodiment, the atomized fluid 52 can remove a majority to almost all of the material adhered on the inner surface 34 of the optical window 32. In an embodiment, a liquid selected for the liquid $F_2$ can establish a favorable zeta potential (e.g., repel vs. attract) that can, for example, prevent debris and particles from reattaching to the inner surface 34 of the optical window 32.

In an embodiment, the discharge direction may vary from being perpendicular to the inner surface 34. In an embodiment, the nozzle 50 may be configured to discharge the atomized fluid 52 in a discharge direction $D_4$ that is within 45 degrees of a direction $D_3$ that is normal to the inner surface 34 of the optical window 32. For example, the nozzle 50 may be configured to discharge atomized fluid 52 such that an angle $\alpha$ between the discharge direction $D_4$ and the direction $D_3$ normal to the inner surface 34 is less than 45 degrees. It will be appreciated that those of ordinary skill in the art with knowledge of this disclosure will understand that the discharge direction $D_4$ can be selected to accomplish a desired cleaning effect.

In FIG. 2, the nozzle 50 and the passageway 12 are separate pieces and the nozzle 50 is attached with threads 24. However, it should be appreciated that the nozzle 50 in an embodiment may be attached in a different manner such as, but not limited to, clamping, welding, machining together, suitable combinations thereof, or the like. In an embodiment, the passageway 12 and nozzle 50 may be a single continuous component.

Figure 3:
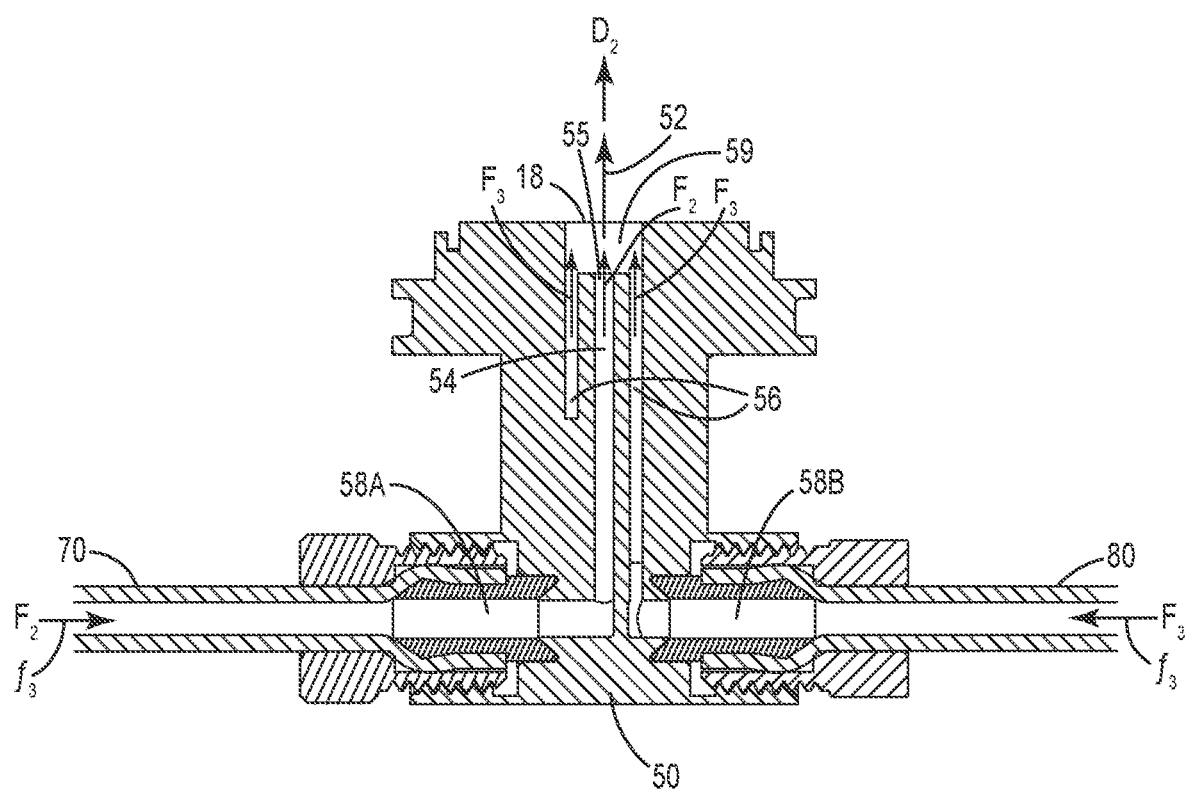
FIG. 3 is an enlarged cross sectional view of the nozzle in FIG. 2, according to an embodiment of the disclosure.

FIG. 3 is an enlarged view of the nozzle 50 and the conduits 70, 80. As described above, the conduits 70, 80 supply the liquid $F_2$ and the gas $F_3$ to the nozzle 50, respectively. In an embodiment, the nozzle 50 includes a chamber 59 that for forming the atomized fluid 52 from the liquid $F_2$ and the gas $F_3$.

The nozzle 50 includes an inner channel 54 and a first inlet 58A for the liquid $F_2$. The second conduit 70 connects to the first inlet 58A and supplies the liquid $F_2$ to the first inlet 58A of the nozzle 50. The first inlet 58A is fluidly connected to the inner channel 54. The liquid $F_2$ flows from the second conduit 70 to the inner channel 54 via the first inlet 58A. The liquid $F_2$ flows through the inner channel 54 and into the chamber 59.

The nozzle 50 includes an outer channel 56 and a second inlet 58B for the gas $F_3$. The second conduit 80 connects to the second inlet 58B and supplies the gas $F_3$ to the second inlet 58B of the nozzle 50. The second inlet 58B is fluidly connected to the outer channel 56. The gas $F_3$ flows from the conduit 80 to the outer channel 56 via the second inlet 58B. The gas $F_3$ flows through the outer channel 56 and into the chamber 59.

The outer channel 56 surrounds the inner channel 54. The inner channel 54 has an end 55 that is at the chamber 59. The end 55 is opposite to the first inlet 58A. In an embodiment, the outer channel 56 is concentric with the first channel 56 at the end 55 of the inner channel 54. The liquid $F_2$ flows into the chamber 59 from the inner channel 54 while the gas $F_3$ flows into the chamber 59 from the outer channel 54.

The gas $F_3$ exits the outer channel 56 and mixes into with the liquid $F_2$ in the chamber 59. In mixing into the liquid $F_2$, the gas $F_3$ disperses the liquid $F_2$ into droplets and accelerates the liquid $F_2$ droplets. In an embodiment, the gas $F_3$ exiting the outer channel 56 has a greater speed than the liquid $F_2$ exiting the inner channel 54. The atomized fluid 52 is then directed from the chamber 59 out through the opening 18 of the nozzle 50 in the discharge direction $D_2$. In an embodiment, the discharge direction $D_2$ is the direction of the mean velocity of the atomized fluid 52 at the opening 18.

In an embodiment, all of the liquid $F_2$ and gas $F_3$ supplied to the nozzle 50 is discharged. The atomized fluid 52 cleans the optical window 32. The nozzle 50 is operated by controlling the flowrates $f_2$, $f_3$ of the liquid $F_2$ and the gas $F_3$ supplied to the nozzle 50. In an embodiment, and as discussed above, the flow valves 74, 84 (shown in FIG. 1) control the flowrates $f_2$, $f_3$ of the liquid $F_2$ and the gas $F_3$ to the nozzle 50. In an embodiment, the flow valves 74, 84 are closed to stop the cleaning of the optical window 32 by the nozzle 50. In an embodiment, the cleaning of the optical window 32 is started by opening both of the valves 74, 84. In an embodiment, the controller 90 is configured to only start the cleaning when the valve 64 for the process fluid $F_1$ is closed.

When cleaning of the optical window 32 is desired, the flow valves 74, 84 are opened so that the liquid $F_2$ and the gas $F_3$ to the nozzle 50. The nozzle 50 then discharges the atomized fluid 52 at the inner surface 34 of the optical window 32, which cleans the inner surface 34 of the optical window 32. In an embodiment, the atomized fluid 52 contains at or about 20% or less than 20% by volume of the liquid $F_2$. In an embodiment, the atomized fluid 52 contains at or about 0.65% or less than 0.65% by volume of the liquid $F_2$. In an embodiment, the atomized fluid 52 contains at or about 0.02% or more than 0.02% by volume of the liquid $F_2$. In an embodiment, the atomized fluid 52 contains at or about 0.15% or more than 0.15% by volume of the liquid $F_2$. In an embodiment, the atomized fluid 52 contains about 0.02%-20% by volume of the liquid $F_2$.

In an embodiment, when the optical window 32 is being cleaned, the second conduit 70 supplies about 0.5-2 liters per minute (LPM) of the liquid $F_2$ to the nozzle 50. In an embodiment, when the optical window 32 is being cleaned, the third conduit 80 supplies about 10-300 standard liters per minute (SLPM) of the gas $F_3$ to the nozzle 50. In an embodiment, the ratio ($f_2$:$f_3$) of the flowrate $f_2$ of the liquid $F_2$ to the flowrate $f_3$ of the gas $F_3$ is from about 0.05:300 to about 2:10. In an embodiment, the controller 90 may be configured to adjust the flow valves 74, 84 so that the above flowrates $f_2$, $f_3$ of liquid $F_2$ and gas $F_3$ are supplied to the nozzle 50. In an embodiment, the controller 90 may be configured to close the flow valves 74, 84 when the process fluid $F_1$ is flowing into through passageway 12.

Figure 4:
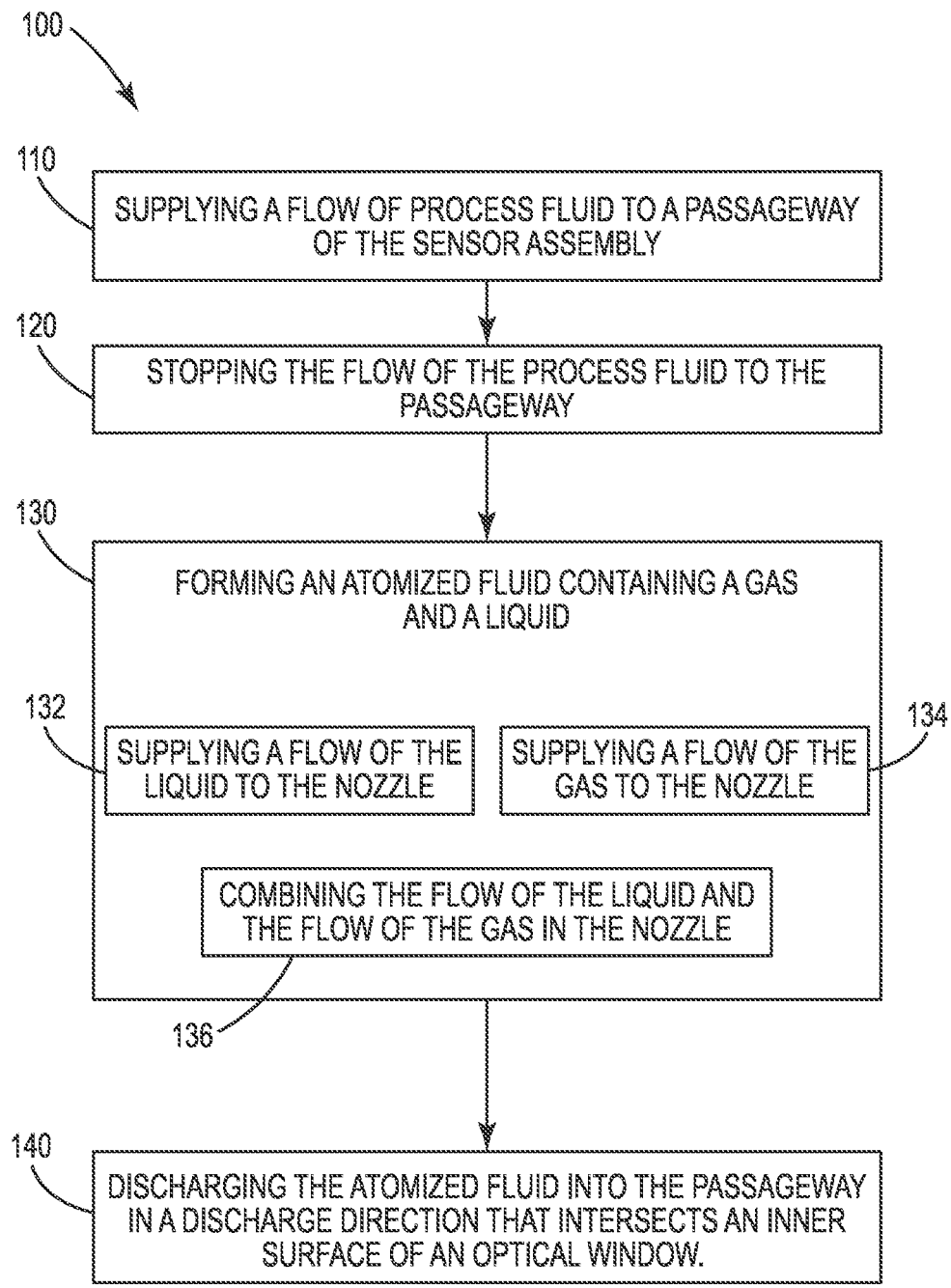
FIG. 4 is a block diagram of an embodiment of a method of cleaning an optical window in a sensor assembly.

FIG. 4 is a block diagram of an embodiment of a method 100 of cleaning an optical window in a sensor assembly. For example, the method 100 may be for cleaning the optical window 32 in the sensor assembly 10 in FIGS. 1-3. In an embodiment, the optical window 32 may be part of a sensor system (e.g., the sensor system 1). The method starts at 110.

At 110, a flow of process fluid (e.g., process fluid $F_1$) is supplied to a passageway (e.g., passageway 12) of the sensor assembly (e.g., sensor assembly 10). The sensor assembly includes the passageway, an optical window (e.g., optical window 32), and an optical sensor (e.g., optical sensor 38). The optical sensor is configured to transmit light towards the passageway through the optical window to detect an optical property of the fluid. The process fluid contacts the optical window while flowing through the passageway. The method 100 then proceeds to 120.

At 120, the flow of the process fluid to the passageway is stopped. In an embodiment, a flow valve (e.g. flow valve 64) controls the flow of the process fluid. In an embodiment, stopping the flow of the process fluid 120 may include closing the flow valve. The method 100 then proceeds to 130.

At 130, an atomized fluid (e.g., atomized fluid 52) containing a gas (e.g., gas $F_3$) and a liquid (e.g., liquid $F_2$) is formed. In an embodiment, forming the atomized fluid 130 includes supplying a flow of the liquid to a nozzle 132 (e.g., nozzle 50). In an embodiment, the liquid is supplied to the nozzle by a conduit (e.g., conduit 70). The conduit may supply the liquid to an inlet of the nozzle (e.g., first inlet 58A). In an embodiment, forming the atomized fluid 130 includes supplying a flow of the gas to the nozzle 134. In an embodiment, the gas is supplied to the nozzle by a second conduit (e.g., conduit 80). The conduit may supply the gas to a second inlet (e.g., second inlet 58B).

In an embodiment, forming the atomized fluid 130 also includes combining the flow of the liquid and the flow of the gas in the nozzle 136. The flow of the liquid and the flow of the gas combine to form the atomized fluid. In an embodiment, the nozzle 136 includes a chamber (e.g., chamber 59). The flow of liquid and the flow gas each flow into the chamber and combine in the chamber. The method 100 then proceeds from the 130 to 140.

At 140, the atomized fluid is discharged into the passageway by the nozzle. The atomized fluid is discharged in a discharge direction (e.g., discharge direction $D_2$) that intersects an inner surface 34 of the optical window 32. Liquid droplets in the atomized fluid are configured to impact the inner surface 34 at high speeds. Material adhered to the inner surface 34 of the optical window 32 is dislodged by the high speed impacts of the liquid droplets.

In an embodiment, the method 100 may be modified based on the sensor system 1 as shown in FIG. 1 or as described above, and the sensor assembly 1 shown in FIG. 1-3 or as described above. For example, the method 100 may include stopping the supply of the liquid with a valve.

Aspects:

Any of aspects 1-7 can be combined with any of aspects 8-19, and any of aspects 8-15 can be combined with any of aspects 16-19.

Aspect 1. A sensor assembly, comprising: a passageway for a process fluid to flow through the sensor assembly; an optical window including an inner surface that forms a first portion of a sidewall of the passageway; an optical sensor configured to transmit light through the optical window towards the passageway to detect an optical property of the process fluid; and a nozzle for discharging a liquid and a gas in the form of an atomized fluid into the passageway in a direction that impacts the inner surface of the optical window.

Aspect 2. The sensor assembly of aspect 1, wherein the atomized fluid is discharged into the passageway through an opening in a second portion of the sidewall of the passageway.

Aspect 3. The sensor assembly of aspect 2, wherein the first portion of the sidewall and the second portion of the sidewall are arranged on opposite sides in the passageway.

Aspect 4. The sensor assembly of any one of aspects 1-3, wherein an angle between the discharge direction and a direction normal to the inner surface of the optical window is less than 45 degrees.

Aspect 5. The sensor assembly of any one of aspects 1-4, wherein the nozzle includes an outer channel for the gas and an inner channel for the liquid, the outer channel surrounding the inner channel, the nozzle forming the atomized fluid by combining the gas with the liquid.

Aspect 6. The sensor assembly of any one of aspect 1-5, wherein the atomized fluid contains about 0.05-20% by volume of the liquid.

Aspect 7. The sensor assembly of any one of aspects 1-6, wherein the liquid is deionized water and the gas is an inert gas.

Aspect 8. A sensor system, comprising: a sensor assembly for a process fluid, the sensor assembly including: a passageway for the process fluid to flow through the sensor assembly; an optical window with an inner surface that forms a sidewall of the passageway; an optical sensor configured to transmit light through the optical window towards passageway to detect an optical property of the process fluid, and a nozzle for forming an atomized fluid containing a liquid and a gas, the nozzle configured to discharge the atomized fluid into the passageway in a direction that impacts the inner surface of the optical window; a first conduit fluidly connected to the nozzle for supplying the liquid to the nozzle; and a second conduit fluidly connected to the nozzle for supplying the gas to the nozzle.

Aspect 9. The sensor system of aspect 8, wherein the process fluid contacts the inner surface of the optical window.

Aspect 10. The sensor system of one of aspects 8 or 9, wherein the atomized fluid is discharged into the passageway through an opening in the sidewall of the passageway.

Aspect 11. The sensor system of aspect 10, wherein the opening in the sidewall of the passageway and the optical window are arranged on opposite sides of the passageway.

Aspect 12. The sensor system of any one of aspects 8-11, wherein the nozzle includes an outer channel and an inner channel, the outer channel surrounding the inner channel, the first conduit supplying the liquid to the inner channel of the nozzle and second conduit supplying the gas to the outer channel of the nozzle.

Aspect 13. The sensor system of any one of aspects 8-12, wherein the first conduit supplies a flowrate of the liquid to the nozzle and the second conduit supplies a flowrate of the gas to the nozzle such that the atomized fluid contains about 0.02%-20% by volume of the liquid.

Aspect 14. The sensor system of any one of aspects 8-13, wherein the first conduit supplies a flowrate of the liquid to the nozzle and the second conduit supplies a flowrate of the gas to the nozzle, the ratio of the flowrate of the liquid to the volume of gas is from 0.05:300 to 2:10.

Aspect 15. The sensor system of any one of aspects 8-14, further comprising: a first flow valve controlling flow of the liquid through the first conduit to the nozzle; a second flow valve controlling flow of the gas through the second conduit to the nozzle; and the controller configured to close the first flow valve and the second flow valve when the process fluid is flowing into the passageway.

Aspect 16. A method of cleaning an optical window in a sensor assembly, the sensor assembly including a passageway and an optical sensor that transmits light towards a passageway via the optical window to detect an optical property of a process fluid flowing through the passageway, the method comprising: forming an atomized fluid containing a gas and a liquid; and discharging the atomized fluid into the passageway in a direction that impacts an inner surface of the optical window.

Aspect 17. The method of aspect 16, wherein forming the atomized fluid includes: supplying a flow of the liquid to a nozzle, supplying a flow of the gas to the nozzle, mixing, in the nozzle, the flow of the liquid and the flow of the gas.

Aspect 18. The method of one of aspects 16 or 17, wherein discharging the atomized fluid into the passageway in the direction that impacts the inner surface of the optical window includes directing the atomized fluid through an opening in a sidewall of the passageway in the direction.

Aspect 19. The method of any one of aspects 16-18, further comprising: supplying a flow of the process fluid to the passageway; and stopping the flow of the process fluid into the passageway before discharging the atomized fluid into the passageway.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A sensor assembly, comprising:
  a passageway for a process fluid to flow through the sensor assembly;
  an optical window including an inner surface that forms a first portion of a sidewall of the passageway;
  an optical sensor configured to transmit light through the optical window towards the passageway to detect a refractive index of the process fluid; and
  a nozzle for discharging an atomized fluid containing a liquid and a gas wherein the gas disperses the liquid into droplets into the passageway in a direction that impacts the inner surface of the optical window;
  wherein the nozzle includes an outer channel for the gas and an inner channel for the liquid, the outer channel surrounding the inner channel, the nozzle forming the atomized fluid by combining the gas with the liquid.

2. The sensor assembly of claim 1, wherein the atomized fluid is discharged into the passageway through an opening in a second portion of the sidewall of the passageway.

3. The sensor assembly of claim 2, wherein the first portion of the sidewall and the second portion of the sidewall are arranged on opposite sides in the passageway.

4. The sensor assembly of claim 1, wherein an angle between the discharge direction and a direction normal to the inner surface of the optical window is less than 45 degrees.

5. The sensor assembly of claim 1, wherein the atomized fluid contains about 0.05-20% volume of liquid.

6. The sensor assembly of claim 1, wherein the liquid is deionized water and the gas is an inert gas.

7. A sensor system, comprising:
a sensor assembly for a process fluid, the sensor assembly including:
a passageway for the process fluid to flow through the sensor assembly;
an optical window with an inner surface that forms a sidewall of the passageway;
an optical sensor configured to transmit light through the optical window towards the passageway to detect a refractive index of the process fluid, and
a nozzle for forming an atomized fluid containing a liquid and a gas wherein the gas disperses the liquid into droplets, the nozzle configured to discharge the atomized fluid into the passageway in a direction that impacts the inner surface of the optical window
wherein the nozzle includes an outer channel for the gas and an inner channel for the liquid, the outer channel surrounding the inner channel, the nozzle forming the atomized fluid by combining the gas with the liquid;
a first conduit fluidly connected to the nozzle for supplying the liquid to the nozzle; and
a second conduit fluidly connected to the nozzle for supplying the gas to the nozzle.

8. The sensor system of claim 7, wherein the process fluid contacts the inner surface of the optical window.

9. The sensor system of claim 7, wherein the atomized fluid is discharged into the passageway through an opening in the sidewall of the passageway.

10. The sensor system of claim 9, wherein the opening in the sidewall of the passageway and the optical window are arranged on opposite sides of the passageway.

11. The sensor assembly of claim 7, wherein the nozzle includes an outer channel and an inner channel, the outer channel surrounding the inner channel, the first conduit supplying the liquid to the inner channel of the nozzle and the second conduit supplying the gas to the outer channel of the nozzle.

12. The sensor system of claim 7, wherein the first conduit supplies a flowrate of the liquid to the nozzle and the second conduit supplies a flowrate of the gas to the nozzle such that the atomized fluid contains about 0.02%-20% volume of liquid.

13. The sensor system of claim 7, wherein the first conduit supplies a flowrate of the liquid to the nozzle and the second conduit supplies a flowrate of the gas to the nozzle, the ratio of the flowrate of the liquid to the volume of gas is from 0.05:300 to 2:10.

14. The sensor system of claim 7, further comprising:
a first flow valve controlling flow of the liquid through the first conduit to the nozzle;
a second flow valve controlling flow of the gas through the second conduit to the nozzle; and
the controller configured to close the first flow valve and the second flow valve when the process fluid is flowing into the passageway.

15. A method of cleaning an optical window in a sensor assembly, the sensor assembly including a passageway and an optical sensor that transmits light towards a passageway via the optical window to detect a refractive index of a process fluid flowing through the passageway, the method comprising:
forming an atomized fluid using a nozzle from a gas and a liquid wherein the gas disperses the liquid into droplets;
wherein the nozzle includes an outer channel for the gas and an inner channel for the liquid, the outer channel surrounding the inner channel, the nozzle forming the atomized fluid by combining the gas with the liquid; and
discharging the atomized fluid into the passageway in a direction that impacts an inner surface of the optical window.

16. The method of claim 15, wherein forming the atomized fluid includes:
supplying a flow of the liquid to a nozzle,
supplying a flow of the gas to the nozzle,
mixing, in the nozzle, the flow of the liquid and the flow of the gas.

17. The method of claim 15, wherein
discharging the atomized fluid into the passageway in the direction that impacts the inner surface of the optical window includes directing the atomized fluid through an opening in a sidewall of the passageway in the direction.

18. The method of claim 15, further comprising:
supplying a flow of the process fluid to the passageway; and
stopping the flow of the process fluid into the passageway before discharging the atomized fluid into the passageway.

* * * * *